(12) United States Patent
Johnson et al.

(10) Patent No.: US 8,087,694 B2
(45) Date of Patent: Jan. 3, 2012

(54) ATV ROLL BAR SYSTEM

(75) Inventors: Jerry Johnson, Baker City, OR (US); Nadejda Johnson, Baker City, OR (US)

(73) Assignee: Jerry and Nadejda Johnson, Baker City, OR (US)

( * ) Notice: Subject to any disclaimer, the term of this patent is extended or adjusted under 35 U.S.C. 154(b) by 66 days.

(21) Appl. No.: 12/430,412

(22) Filed: Apr. 27, 2009

(65) Prior Publication Data

US 2009/0267335 A1   Oct. 29, 2009

Related U.S. Application Data

(60) Provisional application No. 61/125,997, filed on Apr. 29, 2008.

(51) Int. Cl.
*B60R 21/13* (2006.01)
(52) U.S. Cl. .................. 280/756; 280/807; 297/485
(58) Field of Classification Search .............. 280/756, 280/748, 749, 801.2, 807, 808; 180/90.6; 297/476, 479, 483, 485
See application file for complete search history.

(56) References Cited

U.S. PATENT DOCUMENTS

| | | | | |
|---|---|---|---|---|
| 3,338,532 A * | 8/1967 | Board et al. | | 242/383 |
| 4,198,072 A * | 4/1980 | Hopkins | | 280/267 |
| 4,673,190 A * | 6/1987 | Ahlberg | | 280/304.3 |
| 4,798,399 A * | 1/1989 | Cameron | | 280/756 |
| 4,909,568 A * | 3/1990 | Dal Monte | | 297/284.4 |
| 4,950,017 A * | 8/1990 | Norton | | 296/77.1 |
| 4,973,082 A * | 11/1990 | Kincheloe | | 280/756 |
| 5,110,185 A * | 5/1992 | Schmutz et al. | | 297/410 |
| 5,174,622 A * | 12/1992 | Gutta | | 296/77.1 |
| 5,393,194 A * | 2/1995 | Smith | | 414/546 |
| 5,676,398 A * | 10/1997 | Nurtsch | | 280/806 |
| 6,142,253 A * | 11/2000 | Mueller et al. | | 180/219 |
| 6,543,830 B1 * | 4/2003 | Stuck | | 296/77.1 |
| 7,131,668 B2 * | 11/2006 | Go | | 280/808 |
| 7,445,075 B2 * | 11/2008 | Ozawa et al. | | 180/291 |
| 2004/0080148 A1 * | 4/2004 | Brennan | | 280/756 |
| 2004/0113412 A1 * | 6/2004 | Go | | 280/808 |
| 2004/0232684 A1 * | 11/2004 | Curl | | 280/756 |
| 2005/0121897 A1 * | 6/2005 | Elizondo et al. | | 280/801.1 |
| 2005/0140129 A1 * | 6/2005 | Miki et al. | | 280/756 |
| 2008/0186153 A1 * | 8/2008 | Hayashi | | 340/429 |
| 2010/0052301 A1 * | 3/2010 | Robertson et al. | | 280/756 |
| 2010/0060026 A1 * | 3/2010 | Bowers | | 296/66 |

\* cited by examiner

*Primary Examiner* — Drew Brown
(74) *Attorney, Agent, or Firm* — Jeffrey Parry IP; Jeffrey C. Parry

(57) ABSTRACT

An ATV safety roll bar system including a safety belt, a seat back, and a collapsible emergency shelter adapted to secure to the roll bar and ATV. The roll bar may prevent injury or death in cases of ATV rollover accidents or crashes by absorbing the brunt of the force from the rolling or falling ATV. The seat back may include a rope or strap laced between metal bars having a series of holes, the metal bars being integrated onto the roll bar. The safety belt may be attached to the roll bar at various points and may be configurable to meet the preference of the ATV operator. The system may include a seat belt retractor to secure the operator on the ATV. The system may include rollover stop bars that extend in response to near rollover conditions. The system may include a tilt sensor and alarm warning system.

9 Claims, 17 Drawing Sheets

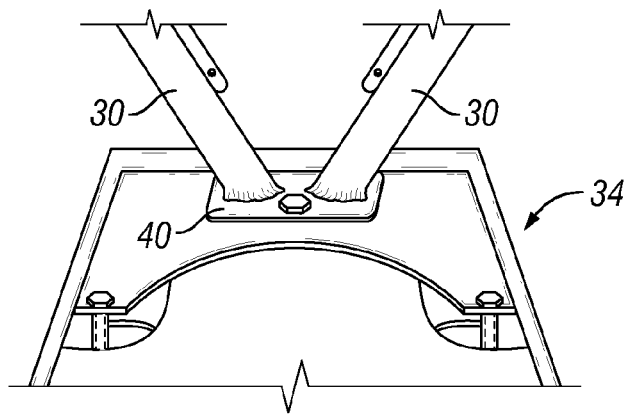
FIG. 5
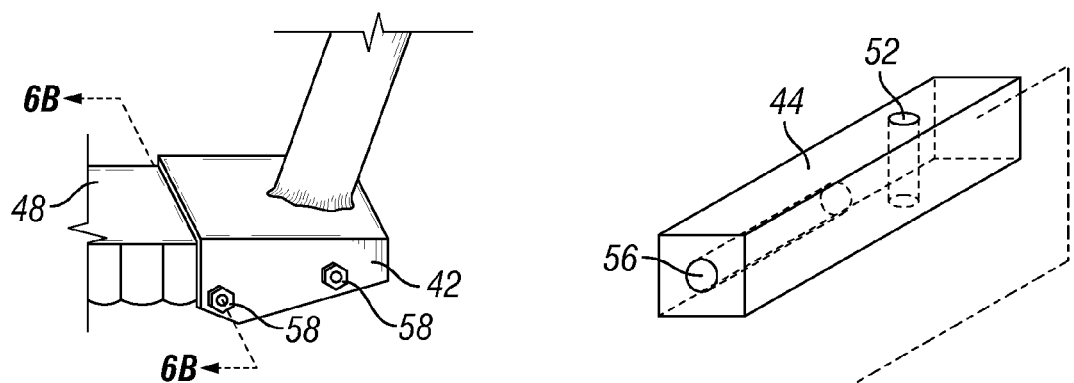
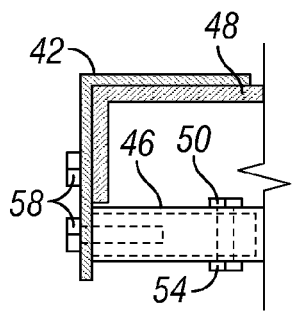
FIG. 6A
FIG. 6B
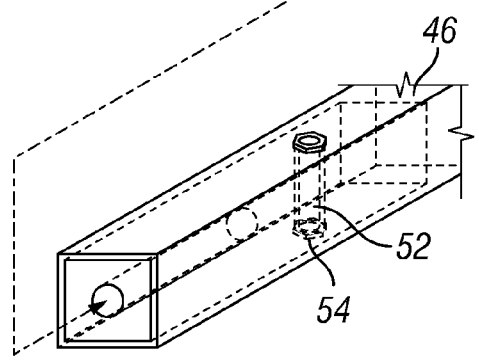
FIG. 6C

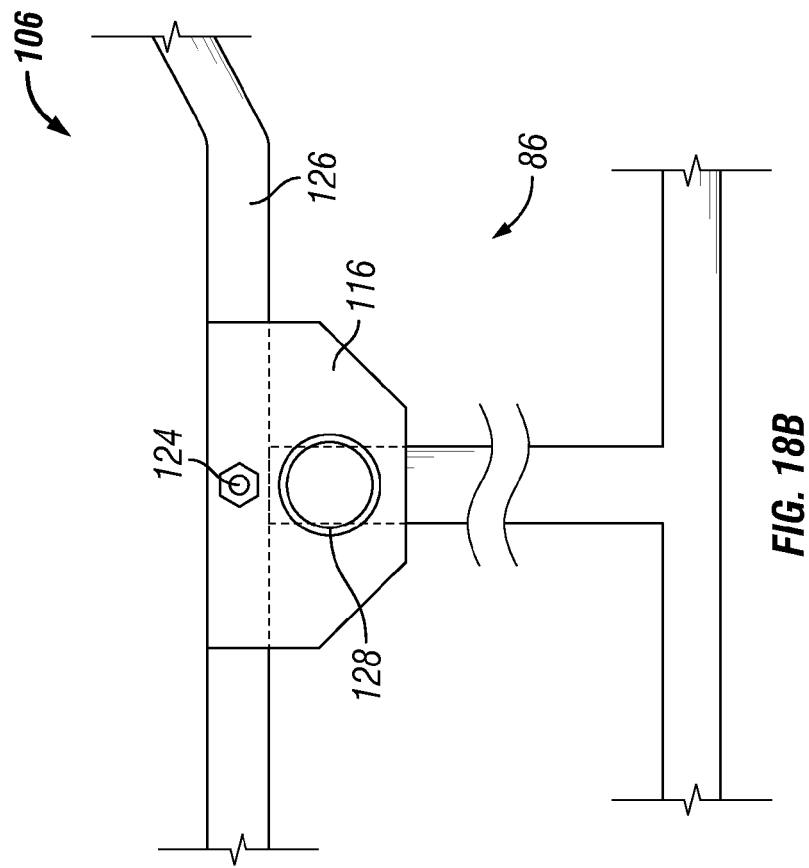
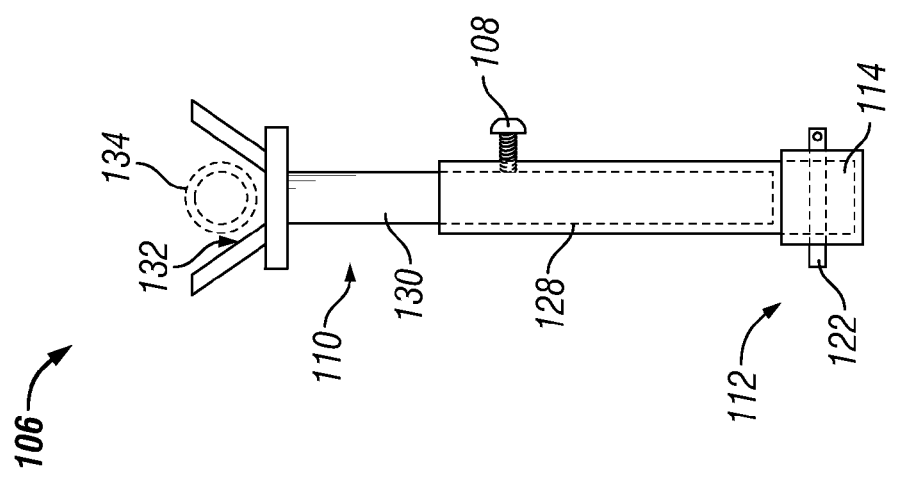
FIG. 18B
FIG. 18A

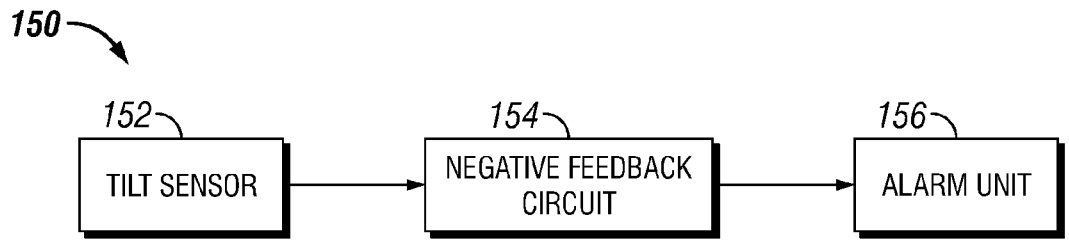
FIG. 20
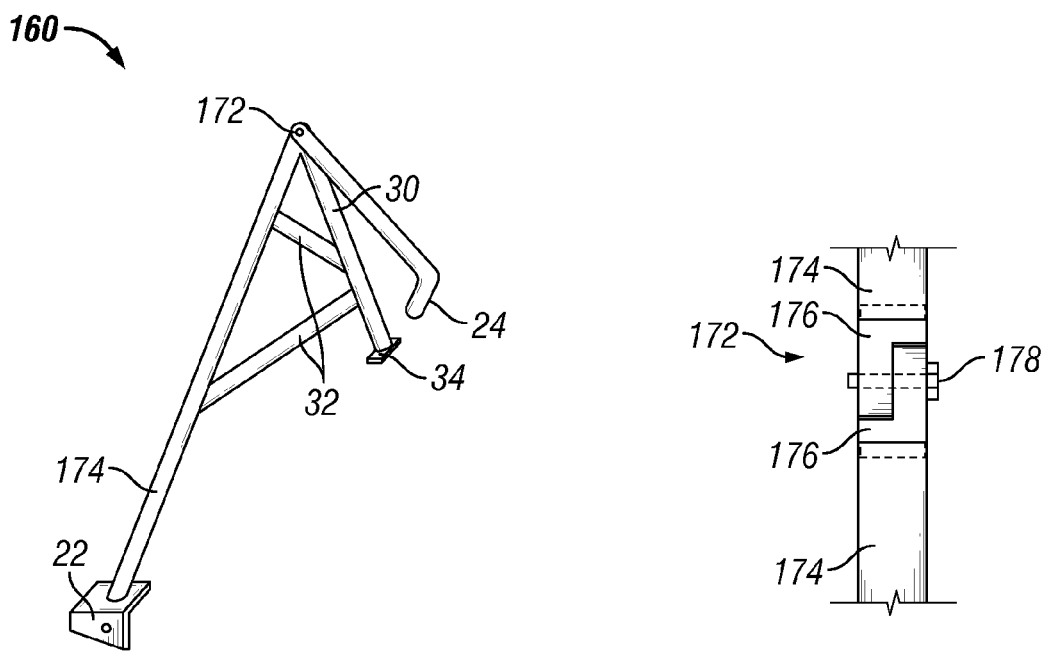
FIG. 21
FIG. 22A
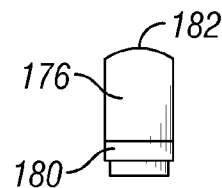
FIG. 22B

ATV ROLL BAR SYSTEM

RELATED APPLICATION

The present application claims the benefit of U.S. Provisional Patent Application No. 61/125,997, entitled "PROTEC ATV SAFETY SYSTEM" filed Apr. 29, 2008, which is incorporated herein by reference in its entirety.

BACKGROUND

1. Field of the Invention

The present disclosure relates generally to a roll bar system and more specifically to a roll bar system for use with all-terrain vehicles ("ATVs").

2. Description of the Related Art

Typically, ATVs are used in off-road applications, for both recreational and work-related uses. An ATV may be generally defined as a vehicle with three or four wheels, a seat that is straddled by a vehicle operator, and handlebars for steering control. An ATV may accommodate only a single rider, or may additionally have seating for a passenger. For the purpose of this disclosure, any use of the term "ATV" herein denotes this generally-accepted definition, and additionally may include any other small off-road vehicles such as a Side by Side or other utility vehicle. The ATV descriptions included herein may refer to a single-occupant ATV or may refer to ATVs that carry passengers.

One principle advantage of ATVs over automobiles is that an ATV may be able to negotiate terrain that is too rough or constricted for a larger vehicle to traverse. As a result, operators may use ATVs by necessity in many areas where the ground is uneven and/or full of obstacles such as trees, hills, boulders, and the like. ATVs may be prone to rollover accidents due to their relatively high center of gravity and likelihood of being operated on steep and/or uneven inclines, around sharp corners and near obstacles. Rollover accidents are very dangerous and may cause serious injury or even death to operators and passengers.

One reason why ATV rollover accidents are dangerous is due to the weight of a typical ATV. ATVs may weigh upwards of 850 pounds. If a rollover accident occurs, the ATV may roll or fall on top of the operator or passenger.

The U.S. Consumer Product Safety Commission estimates that between 1999 and 2006, there were on average 128,150 annual emergency room-treated injuries resulting from ATV-related accidents in the U.S., with the number increasing substantially each year. Each year in the same time period, an average of 567 deaths were reported as resulting from ATV accidents, with even more unreported deaths estimated. For children under 16, the average annual number of ATV-related deaths over the same time period is 134. Over the same period, in approximately 32% of all ATV-related emergency room-treated injuries in the U.S., the person injured is under the age of 16. As the use of ATVs continues to increase, one may expect that ATV-related injuries and deaths will likewise continue to rise.

As a result of the danger that potential rollovers pose to ATV operators and passengers, there is a need for an ATV roll bar system that may protect the ATV operator and passengers from injury in the event of a rollover.

SUMMARY

The aforementioned drawbacks associated with ATVs are addressed by embodiments in this disclosure, which will be understood by one of ordinary skill in the art having the benefit of this disclosure. This summary is not an exhaustive overview, and it is not intended to identify key or critical elements of the disclosure or to delineate the scope of the disclosure as set forth in the appended claims.

An illustrative embodiment of the present disclosure is directed to a roll bar system adapted for an all-terrain vehicle (ATV) including a roll bar and a seat back. The roll bar has a first side member, a second side member, and a top member. The side members extend vertically and are connected to the top member. The roll bar is connected to an ATV frame. The seat back includes a flexible material bound between the first and second side members. The two side members and the top member may include tubing forming an arch over the ATV. The roll bar system may further include a seat belt and a plurality of seat belt connectors. The seat belt connectors may be adapted to connect a portion of the seat belt to the roll bar. The roll bar system may include a seat belt retractor having a locked state and an unlocked state. A portion of the seat belt may be connected within the retractor. The retractor may be adapted to allow extension of the seat belt from within the retractor while unlocked and to prevent extension of the seat belt from within the retractor while locked. The plurality of seat belt connectors may allow an ATV operator to selectively configure the seat belt.

The roll bar system may further include an emergency shelter having a collapsible frame and a fabric cover. The collapsible frame may attach to the ATV and to the roll bar. The fabric cover may be suspended over the collapsible frame. The seat back may further include a nylon rope that extends between the first side member and the second side member. The roll bar system may further include a foot rest guard. The foot rest guard may include a hinged guard or flexible straps. The roll bar system may further include a tilt sensor adapted to output a first signal if the ATV has an inclination exceeding a predetermined value. The roll bar system may further include a negative feedback circuit and an alarm unit. The negative feedback circuit may be adapted to receive the first signal and output a second signal if the first signal has a time duration exceeding a predetermined value. The alarm unit may be adapted to provide an alert upon receiving the second signal.

The first and second side members may each include a hinged section adapted to provide the roll bar with an upright state and a collapsed state. The first and second side members may each include a removably-connectable joint adapted to allow a portion of the roll bar to be removed from another portion of the roll bar. The roll bar system may further include a rollover stop bar adapted to extend from a retracted position and selectively lock into an extended position. The rollover stop bar may extend due to the inclination of the ATV. The rollover stop bar may be selectively locked in the retracted position. The roll bar system may further include a spring that extends the rollover stop bar when the rollover stop bar is released from the retracted position.

Another illustrative embodiment of the present disclosure is directed to a roll bar system adapted for an ATV including a support member arched over the ATV, wherein the support member is connected to an ATV frame. The roll bar system may further include a seat belt connected to the support member. The roll bar system may further include a seat belt retractor having a locked state and an unlocked state.

The roll bar system may further include a back rest secured to the support member. The back rest may include a support member having a series of holes and a flexible member threaded through the series of holes. The roll bar system may further include a tilt sensor adapted to output a signal if the ATV has an inclination exceeding a predetermined value. The roll bar system may further include a rollover stop bar adapted to extend from a retracted position and selectively lock into an extended position. The rollover stop bar may be adapted to extend in response to being released from a retracted locked position. The rollover stop bar may include a solenoid adapted to selectively release the stop bar from its retracted locked position in response to a signal from a tilt sensor. The tilt sensor may be adapted to output a first signal if the ATV has an inclination exceeding a predetermined value. The roll bar may be connected to the ATV frame at three different points.

Another illustrative embodiment of the present disclosure is directed to an ATV equipped with a roll bar system having a roll bar, a seat back, a first rear support member, a second rear support member, a first side support beam, a second side support beam, a seat belt, a plurality of seat belt connectors, a seat belt retractor, and a foot rest guard. The roll bar has a first side member, a second side member, and a top member. The first and second side members and the top member include tubing. The side members generally extend vertically and are connected to the top member and to an ATV frame, thereby forming an arch over the ATV.

The seat back includes a flexible material bound between the first and second side members. A first end of the first support member is connected to the first side member and a second end of the first support member is connected to a rear mounting plate. A first end of the second support member is connected to the second side member and a second end of the second support member is connected to the rear mounting plate. The rear mounting plate is fixed to the ATV frame. A first end of the first side support beam is connected to the first rear support member and a second end of the first side support beam is connected to the first side member. A first end of the second side support beam is connected to the second rear support member. A second end of the second side support beam is connected to the second side member.

The plurality of seat belt connectors are fixed to the roll bar and are adapted to connect a portion of the seat belt to the roll bar. The seat belt retractor is fixed to the rear mounting plate. The seat belt retractor has a locked state and an unlocked state.

These and other embodiments of the present disclosure will be discussed more fully in the description. The features, functions, and advantages can be achieved independently in various embodiments of the claimed invention, or may be combined in yet other embodiments.

BRIEF DESCRIPTION OF THE DRAWINGS

This disclosure may be understood by reference to the following description taken in conjunction with the accompanying drawings, in which like reference numerals identify like elements.

FIG. 5 illustrates an ATV roll bar rear mounting plate;

FIGS. 6A-6C illustrate components of an ATV roll bar side mounting plate;

FIGS. 18A-18B depict a rifle rest attachment on an ATV;

FIG. 20 is a depiction of one illustrative embodiment of an ATV with a tilt sensor system;

FIG. 21 is a depiction of a hinged ATV roll bar;

FIGS. 22A-22B depict a hinge for the hinged ATV roll bar;

Figure 1:
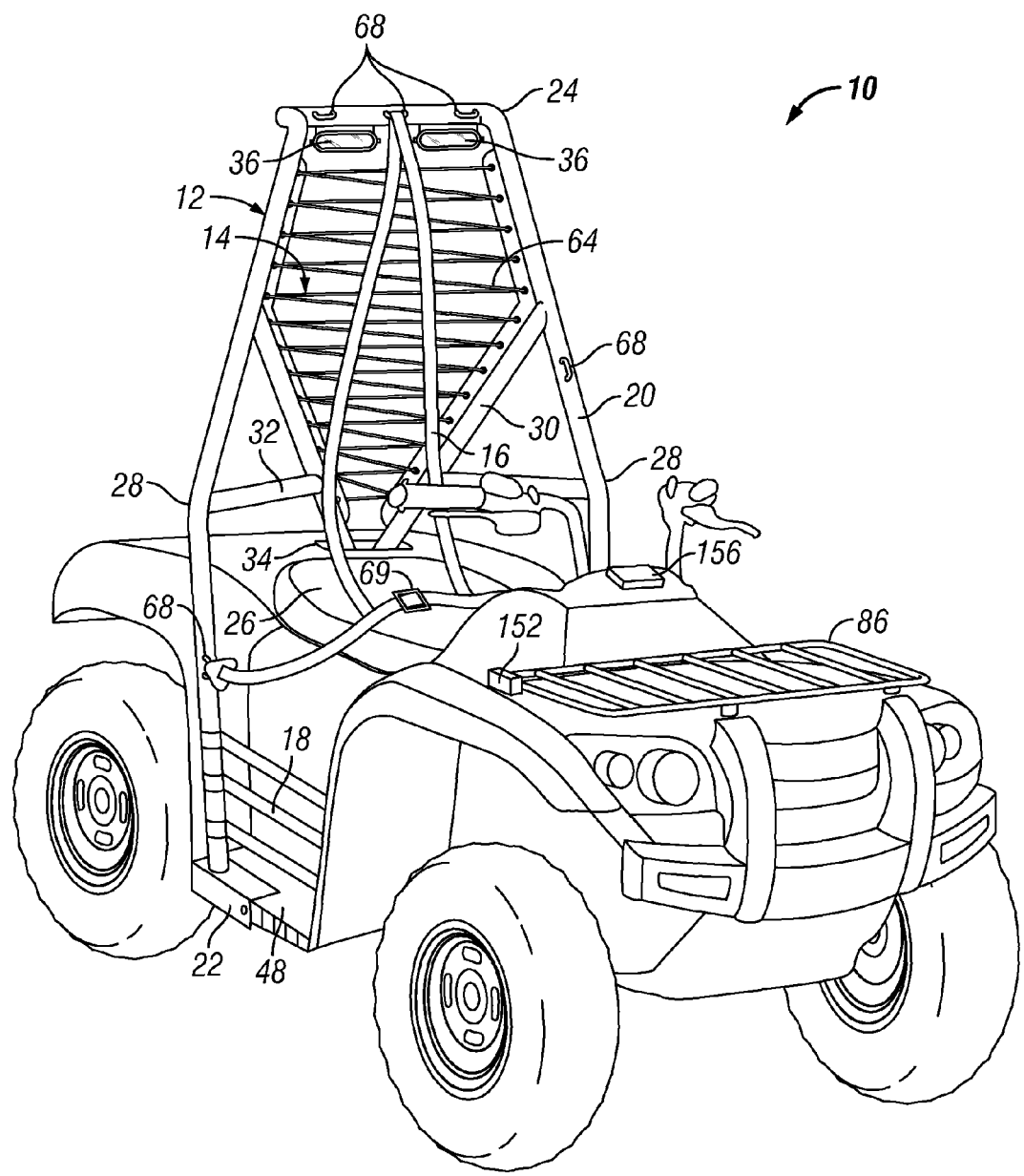
FIG. 1 is a depiction of one illustrative embodiment of an ATV roll bar system.

While the disclosure is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents, and alternatives falling within the spirit and scope as defined by the appended claims.

DETAILED DESCRIPTION

In the following description, reference is made to the accompanying drawings in which is shown by way of illustration specific embodiments in which the contents of this disclosure may be practiced. These embodiments are described in sufficient detail to enable those skilled in the art to practice the invention. It is to be understood that modifications to the various disclosed embodiments may be made, and other embodiments may be utilized, without departing from the spirit and scope of the disclosure. The following detailed description is, therefore, not to be taken in a limiting sense.

Figure 2:
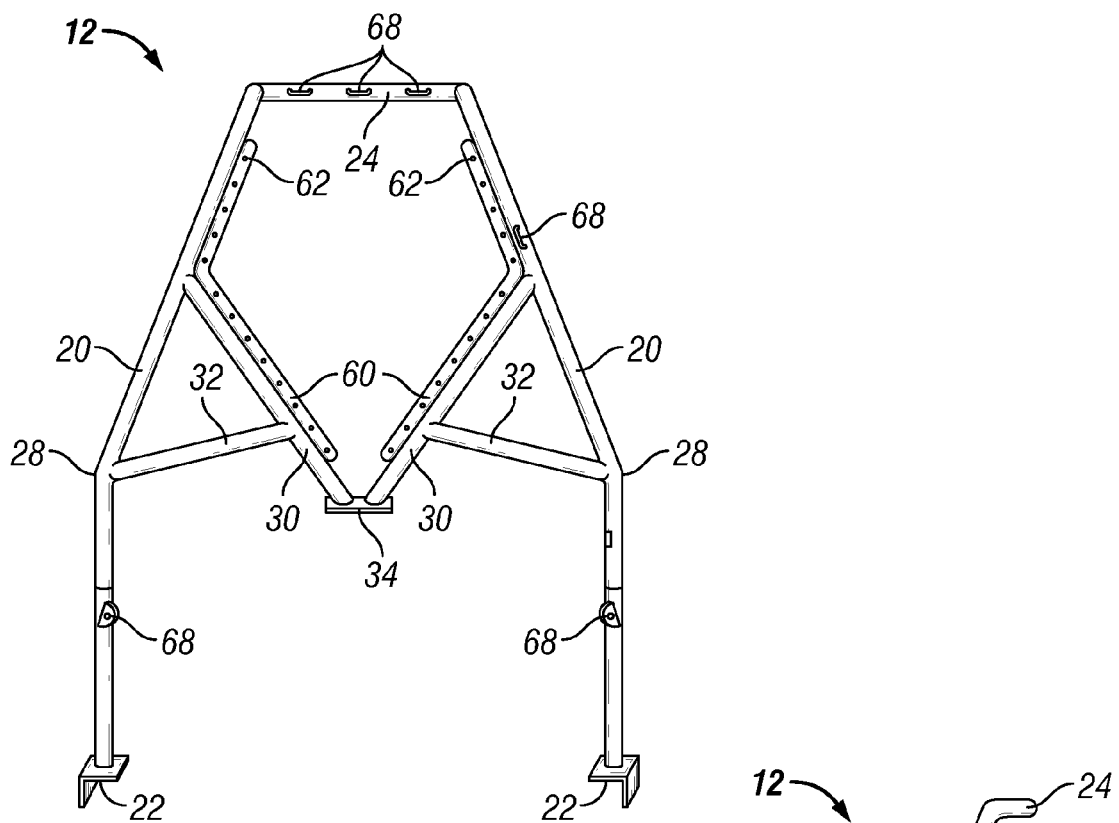
FIG. 2 is a front view of a roll bar.
Figure 3:
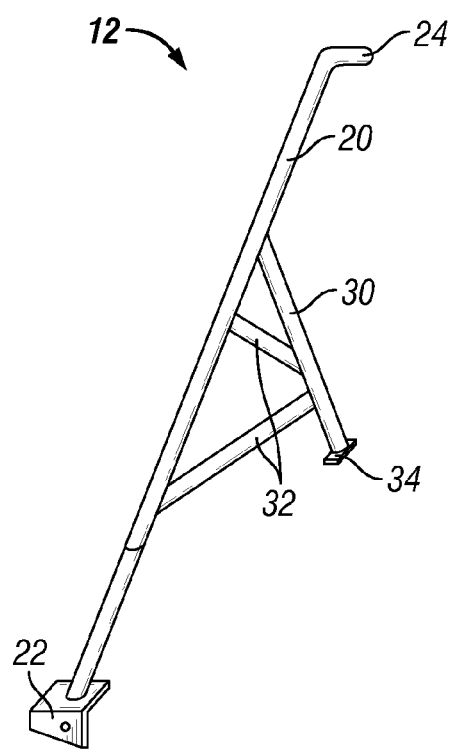
FIG. 3 is a side perspective view of a portion of a roll bar.

FIG. 1 is an illustration of an ATV 10 with a roll bar system installed thereon. The roll bar system is designed to mitigate severe injury or death resulting from ATV rollover accidents. In an embodiment, the roll bar system comprises a roll bar 12, a seat back 14, a seat belt 16, and leg and foot guards 18. The roll bar 12 comprises at least one hollow metal tube anchored to the frame of the ATV 10. As FIGS. 1-3 demonstrate, the roll bar 12 comprises two side members 20 that extend upward from side mounts 22 and connect to a horizontal top member 24, generally forming an arch over the ATV seat 26. Each side member 20 angles inward at 28. The roll bar side and top members 20 and 24 provide enough clearance above the seat 26 that an ATV operator of typical height will not accidentally strike his head against the roll bar 12 while operating, climbing on, or climbing off the vehicle. The roll bar 12 has rear support members 30 and two side support beams 32, each comprising a hollow metal tube. Each rear support member 30 is welded at each end to one side member 20 and to a back mount 34 anchored at the rear of the ATV 10. Each side support beam 32 is welded at each end to one of the side members 20 and the rear support member 30 connected thereto, forming a triangular structure that may increase the roll bar's 12 strength. As can be appreciated by one of ordinary skill having the benefit of this disclosure, there are many possible alternative configurations and designs for an ATV roll bar. Such configurations may have the objects of maximizing structural strength and minimizing cost and weight of the roll bar. For example, a relatively light-weight ATV may not benefit substantially from a roll bar with side support beams and/or rear support members, and thus may not include the same, thereby reducing the overall weight and cost of the roll bar. Alternatively, a roll bar for a relatively heavy ATV may include additional structural support beams to ensure that, in the event of a rollover, the roll bar can support the weight of the rolling or falling ATV. The roll bar 12 is manufactured from chromoly steel. Alternatively, the roll bar may be manufactured from other materials, for example aluminum or composite materials. The roll bar may be manufactured from any substance that sufficiently exhibits the qualities of strength and durability necessary for a roll bar application.

Referring back to FIG. 1, the roll bar system further comprises two running lights 36 rotatably attached to the underside of the roll bar top member 24. The lights 36 may rotate around an axle parallel to the top member 24, such that the lights may shine forward, downward upon the ATV operator, or rearward. The lights 36 are activated by a switch (not shown) located on the roll bar 12. Alternatively, the lights may be activated by a switch on the handlebars, the roll bar 12, or any other suitable location. In an alternate embodiment, the lights may swivel from side to side to provide illumination wherever the ATV operator may desire. Alternatively, the light may be fixed, precluding rotation thereof.

The roll bar 12 may be particularly beneficial because ATVs generally have an increased likelihood to rollover due to their high center of gravity and the type of terrain they typically travel over, as described above. As an ATV 10 rolls over, the operator may fall beneath it and be crushed. This is especially true if the ATV 10 is moving at a high velocity and thus may land on the operator with a large amount of force. Because the roll bar 12 is taller than the operator, it may absorb a large amount of the force from the falling or rolling ATV 10, reducing the possibility that the ATV may crush the operator or passengers. As long as the operator and any passengers remain within the arch of the roll bar 12 and the roll bar 12 remains physically intact, they will not likely be crushed by the ATV 10. The roll bar 12 may further protect the operator and passengers from injury resulting from tree branches and other obstacles in the ATV's 10 path. The roll bar 12 may deflect such obstacles away from the operator and/or passengers.

Figure 4:
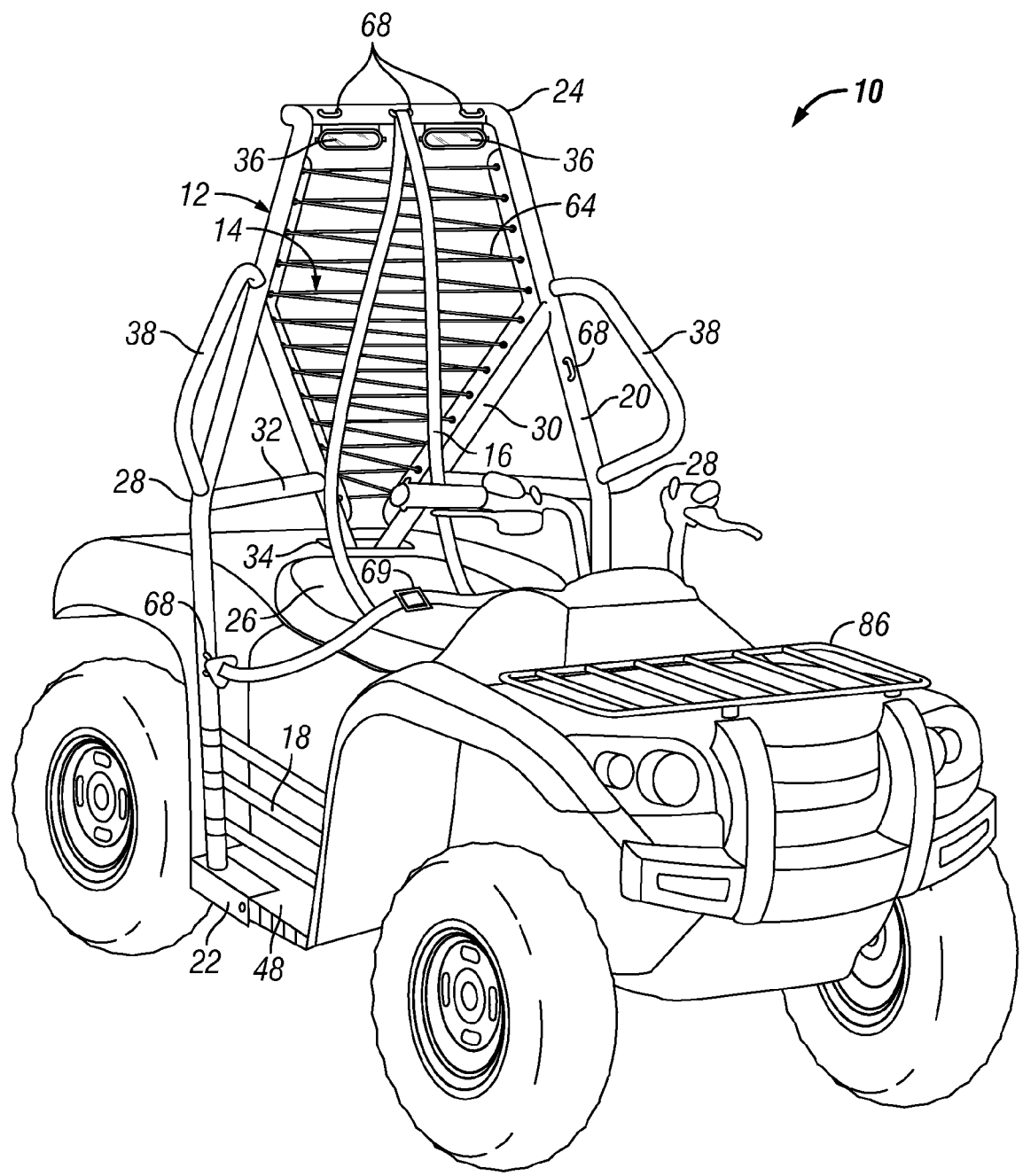
FIG. 4 illustrates an embodiment of the ATV roll bar system including a roll bar having shoulders.
Figure 8:
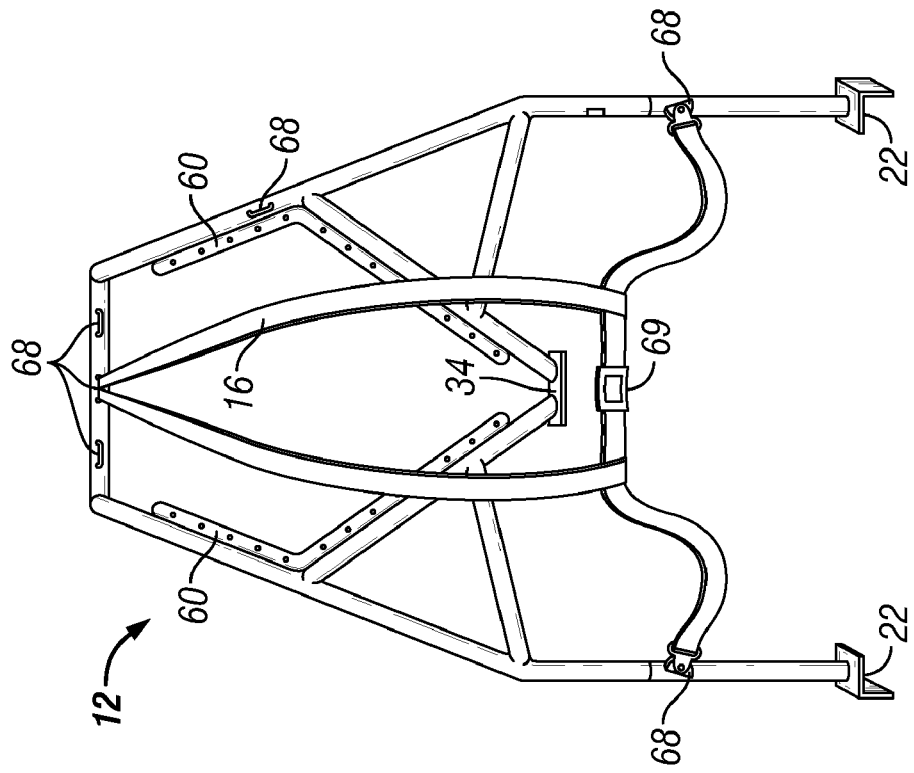
FIG. 8 depicts an embodiment of the ATV roll bar including a V strap style seat belt.

In another embodiment, the roll bar 12 includes roll bar shoulders 38, as shown in FIG. 4. The roll bar shoulders 38 each comprise a curved hollow metal tube with both ends welded to the outside edge of a side member 20. One roll bar shoulder 38 is mounted to each roll bar side member 20. The roll bar shoulders 38 may provide additional protection to the ATV operator and/or passenger in the event of a rollover. The roll bar shoulders 38 may also deflect tree branches and similar obstacles away from the operator and passenger.

FIGS. 5 and 6A-6C depict mounting hardware components that anchor the roll bar 12 to an ATV frame. As shown in FIG. 5, the back mount 34 comprises a back mounting plate 40 welded to ends of the rear support members 30 and bolted to the ATV frame. The back mounting plate 40 is fabricated from a hard, durable material such as steel. Anchoring the roll bar 12 directly to members of the ATV frame, as opposed to superficial ATV body components, may increase the likelihood that the roll bar 12 will remain intact during rollover accidents, and thus will provide increased protection to the ATV operator and/or passengers. There are various acceptable ways to anchor the roll bar 12 to the ATV frame and interconnect the various components of the roll bar 12, as would be appreciated by one of ordinary skill in the art having the benefit of this disclosure.

FIGS. 6A-6C are enlarged illustrations of the side mount 22. The side mount 22 comprises a side mounting plate 42 and a mounting block 44. The side mounting plate 42 has two flat surfaces fixed together roughly at a 90 degree angle. The mounting block 44 is sized to fit snugly within a hollow ATV frame member 46 located near each ATV foot rest 48. The mounting block 44 is positioned within the frame member 46 and a bolt 50 is inserted into a cross bore hole 52 through the frame member 46 and the mounting block 44, thereby securing the mounting block 44 within the frame member 46. A nut 54 tightened onto the bolt 50 secures the bolt 50 within the mounting block 44 and frame member 46. The mounting block 44 further comprises an outward-facing threaded bolt hole 56. Bolts 58 secure the mounting plate 42 to the mounting block 44 and the footrest 48. The particular mounting hardware described herein may vary according to the size and/or orientation of the ATV frame. Many variants of the roll bar mounting hardware described herein are foreseeable by one of ordinary skill having the benefit of this disclosure; such variants fall within the scope of the disclosure.

The roll bar system may further comprise flat steel bars 60 welded to upper portions of the side members 20 and the rear support members 30, as shown in FIGS. 2 and 8-10. The flat steel bars 60 are each welded on an inner-facing surface of the side members 20 and rear support members 30 and each have a bend conforming to the shape of the side member 20 and rear support member 30 junction. Each flat steel bar 60 has a series of holes 62 distributed along its length. A cord 64 is laced through the holes 62, forming the seatback 14 as depicted in FIGS. 1, 4, 7, and 13. The seatback 14 serves the purpose of adding to the ATV operator's comfort by allowing him to lean back on the seatback 14 while sitting on the ATV 10. Further, the seatback 14 increases the safety of the roll bar system by preventing the operator from falling off the ATV 10 backwards. If the ATV 10 were to roll over, the seatback 14 may catch the operator and thereby prevent him from getting crushed beneath the ATV 10 as it rolls. In this manner, the seatback 14 may help the operator to maintain his position under the roll bar 12, thereby avoiding severe injury during a rollover. In the embodiment described herein, the seatback 14 is made of nylon cord 64. Alternatively, the seatback 14 may comprise webbing or a strap fabricated of any flexible, strong material.

Figure 7:
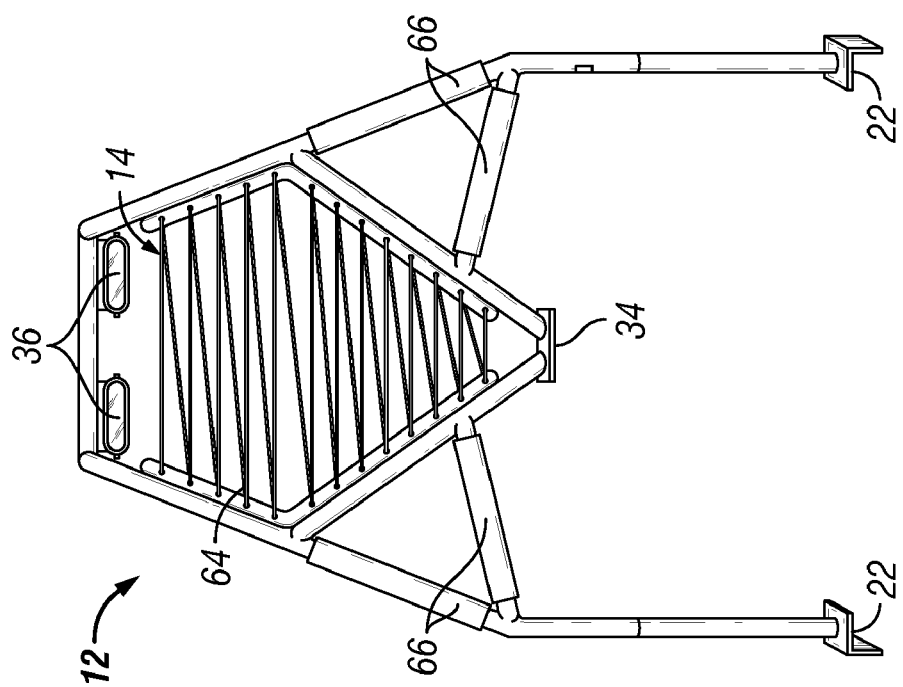
FIG. 7 is a front view of a roll bar frame with a laced rope seat back and padded arm and shoulder protectors installed.
Figure 10:
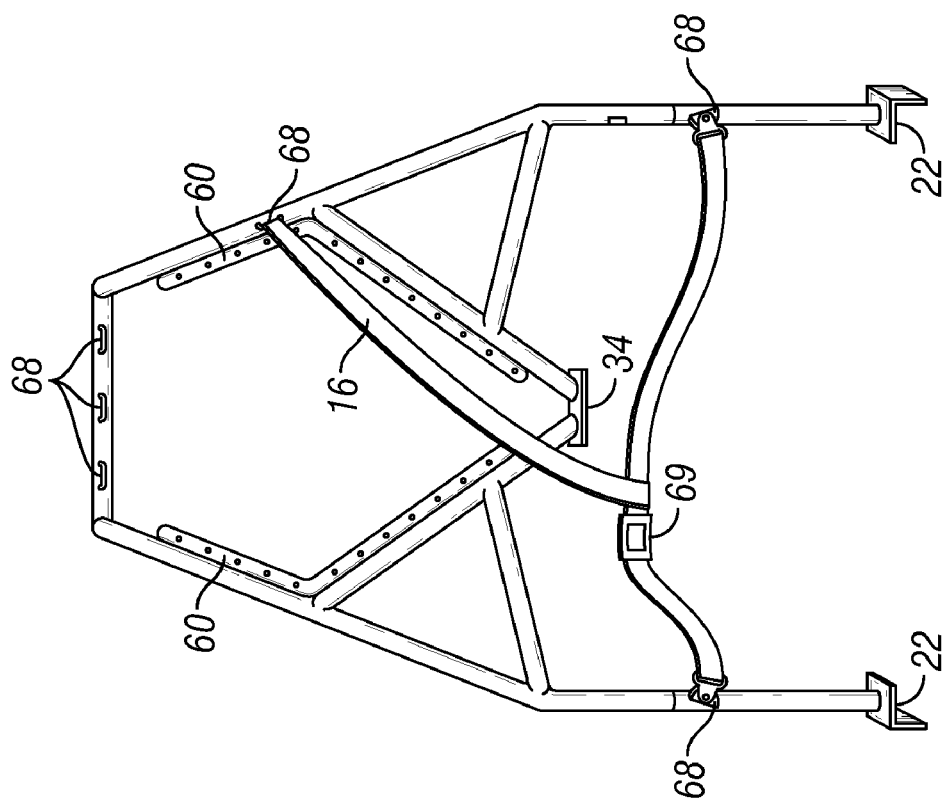
FIG. 10 depicts an embodiment of the ATV roll bar including a cross shoulder style seat belt.
Figure 9:
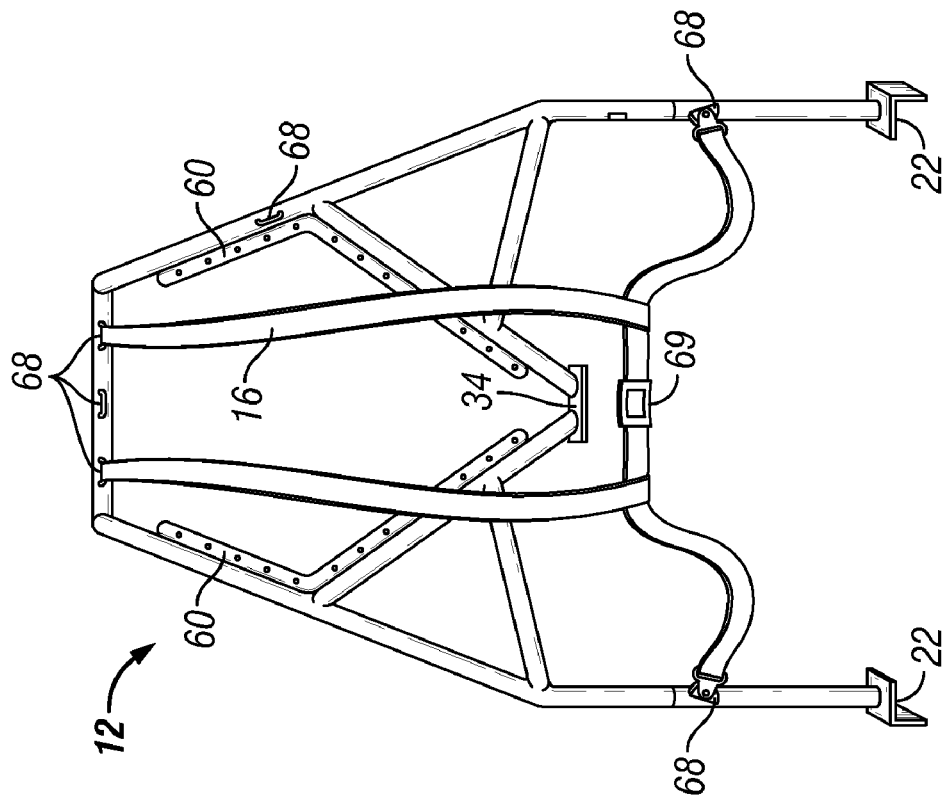
FIG. 9 depicts an embodiment of the ATV roll bar including a split strap style seat belt.

FIG. 7 further depicts a plurality of cylindrical dense foam pads 66 situated around the roll bar 12 at locations where they may be most likely to prevent injuries to the operator due to colliding with the roll bar 12. For example, portions of the roll bar 12 where the operator may be likely to hit her head or arms if involved in a crash are covered with the foam pads 66. Further, the operator may be likely to accidentally strike the roll bar 12 with her head when climbing on or off the ATV 10. Various locations on the roll bar 12, including locations not depicted in the figures, may be equipped with a foam pad 66 or similar protective device.

Referring back to FIG. 1, the roll bar system further comprises a plurality of overhead seat belt connectors 68 located on the roll bar 12 above the ATV operator's seat 26, a shoulder seat belt connector 68 located above the driver's left shoulder, and a plurality of side seat belt connectors 68 on the roll bar 12 to either side of the ATV operator's seat 26. The roll bar system comprises seat belt 16 straps and buckles 69 that may be used to secure the operator to the ATV 10. The multiple overhead seat belt connectors 68 provide the operator with several options of seat belt 16 configuration. For example, the operator could use a V strap configuration, shown in FIG. 8, a split strap configuration, shown in FIG. 9, and a cross-shoulder strap configuration, shown in FIG. 10, based upon user preference. Each seat belt connector 68 is a flat metal piece with a hole passing there through. The seat belt connectors 68 may be welded or bolted to the roll bar 12. The seat belt 16 components may be bolted to the connectors 68 in the various configurations described above, according to the driver's preference. Alternatively, the seat belt connectors 68 may be manufactured from any strong, durable material. Likewise, the seat belt connectors 68 may be manufactured into any shape which allows the ATV operator to secure a seat belt onto the roll bar 12.

The seat belt 16 straps may include strap pads at points on the seat belts 16 that contact the ATV operator. Such pads may increase the rider's comfort by spreading out pressure from the seat belts 16 over a greater area on the ATV operator's body. The seat belts 16 may further include adjusting buckles to allow the ATV operator to adjustably secure himself to the ATV in a snug manner. The seat belt adjustment buckles may be placed on various seat belt 16 straps, thereby allowing the ATV operator to lengthen or shorten shoulder or side seat belt 16 straps.

Figure 11:
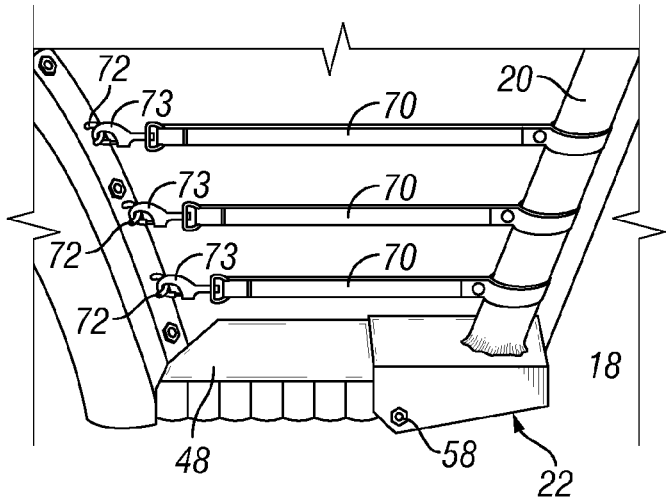
FIG. 11 depicts an ATV roll bar system foot and leg guard comprising nylon straps.

Referring back to FIG. 1, the roll bar system further comprises foot and leg guards 18 at the foot rests 48. The foot and leg guards 18 comprise a plurality of nylon straps 70, as depicted in FIG. 11, looped around the roll bar side members 20 and extending horizontally across an edge of a volume defined as a foot rest well. The nylon straps 70 are removably attached to D-rings 72 on the front fender surface opposing the roll bar side member 20 by hooks 73 attached to the nylon straps 70. While the D-rings 72 and hooks 73 remain attached, the straps 70 may prevent the operator's feet and legs from leaving the foot rest well during a crash or rollover, thereby preventing potential severe injuries to the operator. The foot and leg guards 18 also may serve to prevent rocks, sticks, and other trail debris from entering the foot rest well, which may be injurious to the operator.

Figure 12A:
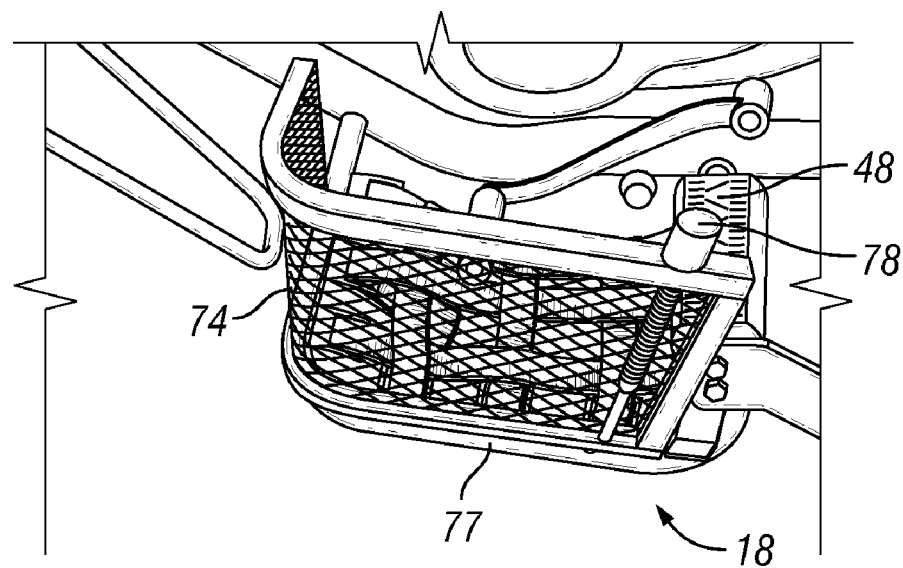
FIGS. 12A-12B depict an ATV roll bar system foot and leg guard comprising a hinged guard.
Figure 12B:
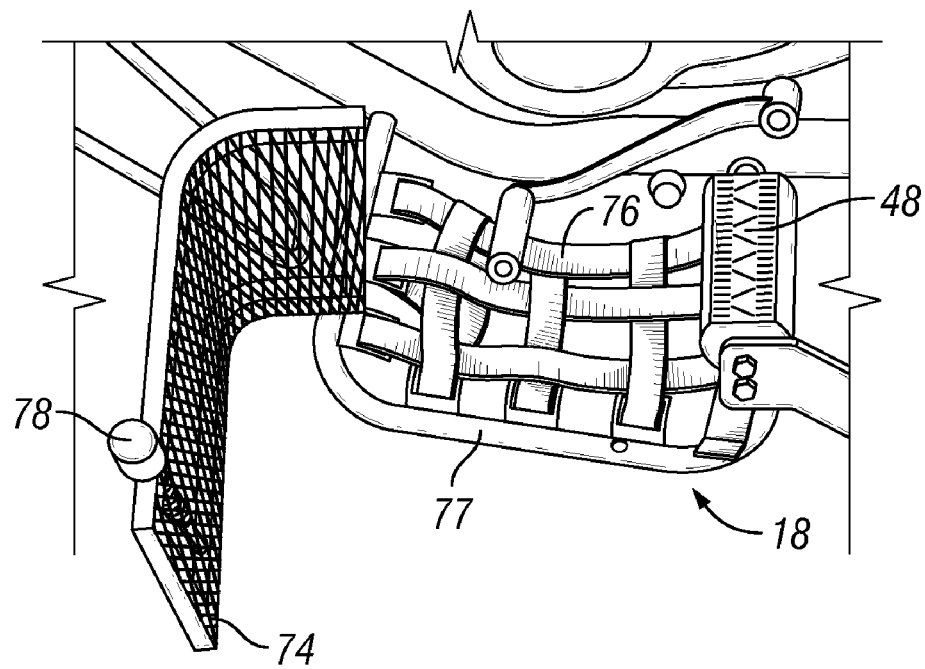

In another embodiment, the foot and leg guards 18 may comprise a metal hinged guard 74 and a plurality of interwoven nylon straps 76 positioned below the foot rest 48, as illustrated in FIGS. 12A and 12B. The interwoven nylon straps 76 are held in place by a rigid frame 77 located below the foot rest 48. The guard 74 comprises a vertical panel that may partially enclose the foot well when in a closed configuration. The hinged guard 74 and interwoven nylon straps 76 prevent debris from entering the foot well and the operator's feet and legs from leaving the foot well. The guard 74 includes a locking pin 78 to secure the guard 74 in its closed configuration. Alternatively, the guard 74 may be molded from high impact plastic.

Figure 15A:
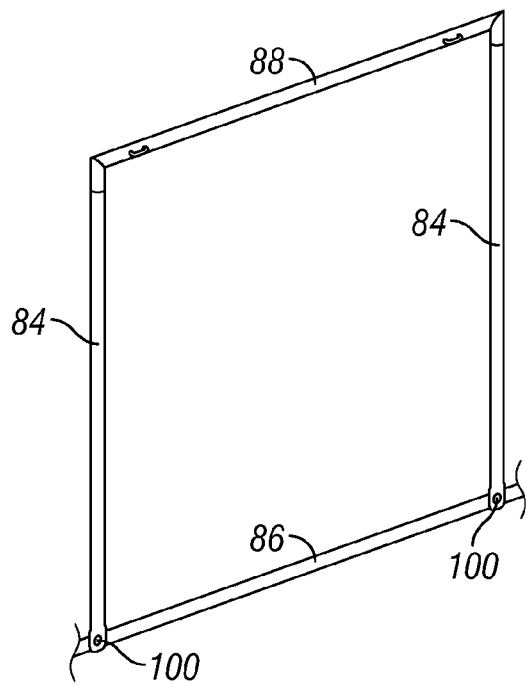
FIGS. 15A-15D depict the light-weight support for an ATV emergency shelter/hunting blind roll bar attachment.
Figure 15B:
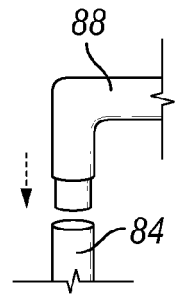
Figure 13:
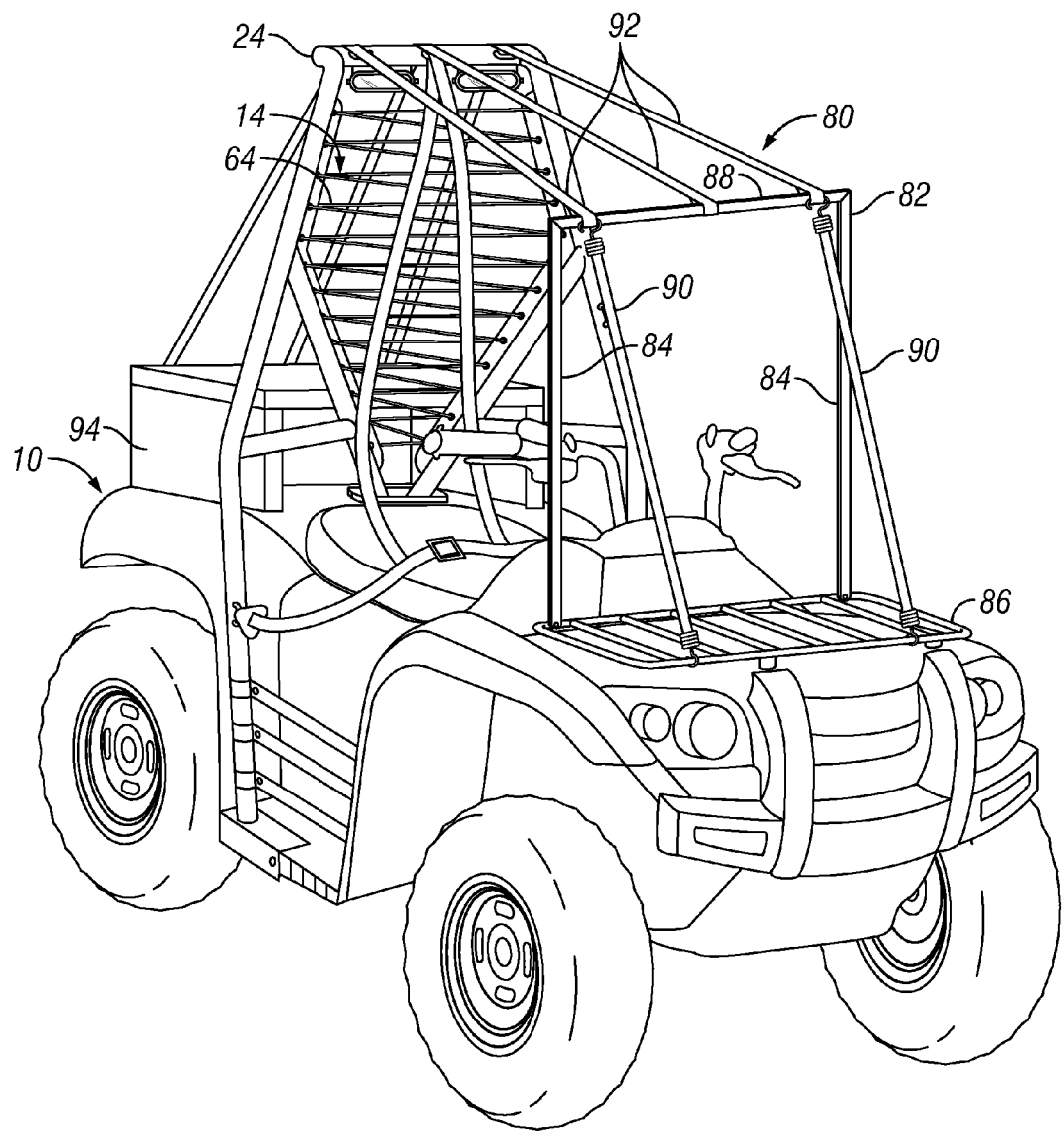
FIG. 13 depicts an ATV with a light-weight support for an ATV emergency shelter/hunting blind roll bar attachment.
Figure 14:
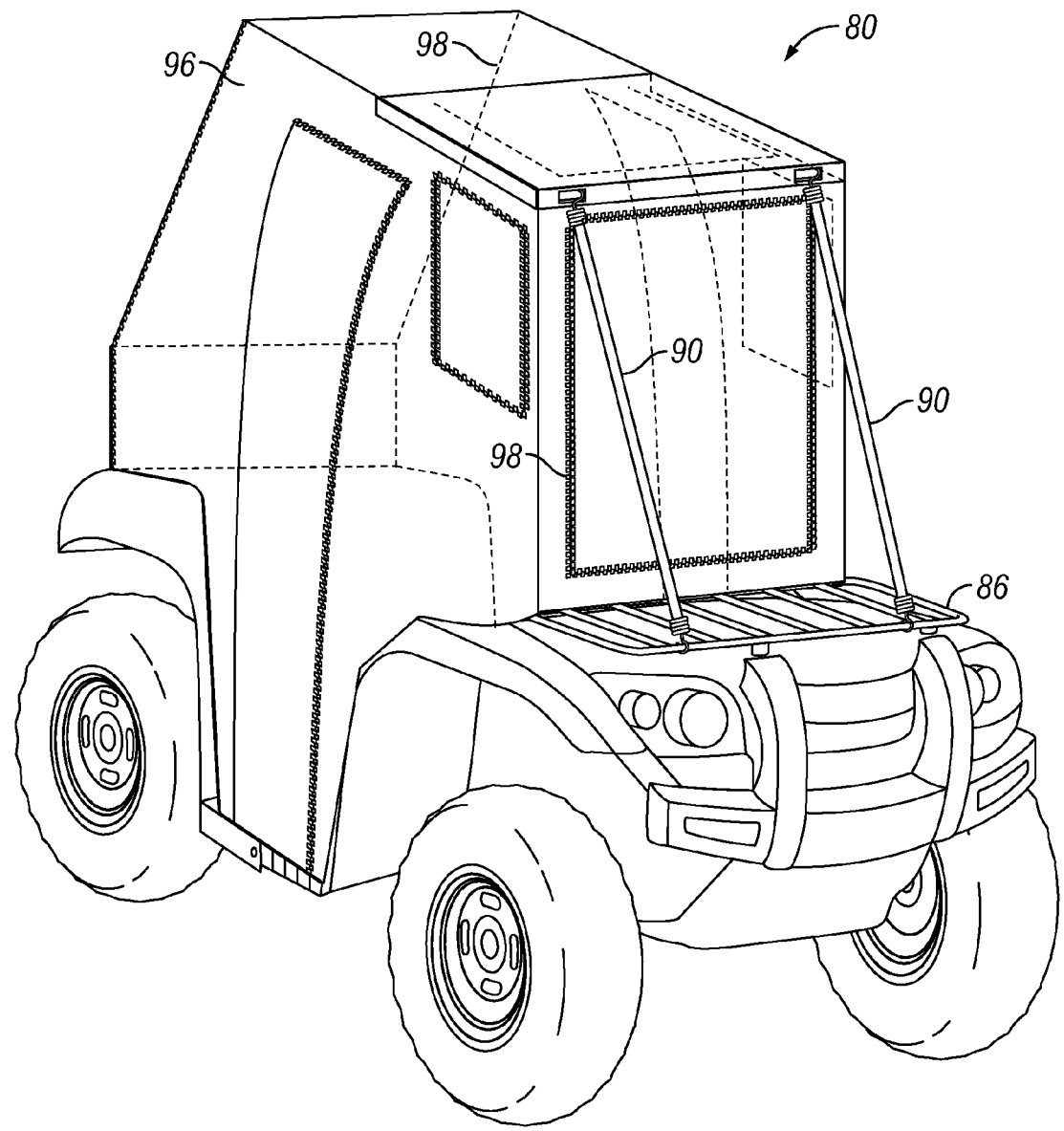
FIG. 14 depicts an ATV with an emergency shelter/hunting blind attached to a light-weight support.

As depicted in FIGS. 13 and 14, the roll bar system may further comprise an emergency shelter 80 that may be suspended from the roll bar 12 and a removable, collapsible light-weight frame 82. FIG. 13 depicts the ATV 10 with the frame 82 assembled and attached to the ATV 10. The frame 82 comprises two vertical support members 84 hingedly connected to a front ATV rack 86. A top horizontal bar 88 with dual elbow bends interconnects with the vertical support members 84 as shown in FIGS. 15A and 15B. The emergency shelter 80 further includes two nylon straps 90 that hook onto the ATV front rack 86 and welded tabs (not shown) on the top horizontal member 88. The nylon straps 90 may be tightened with adjustment buckles (not shown) to add rigidity to the light-weight frame 82. The emergency shelter 80 further comprises three nylon straps 92 that extend from the from the top horizontal member 88, loop over the roll bar top member 24, and extend down to secure to a rear ATV rack 94. The three nylon straps 92 add stability to the structure of the light-weight frame 82 and provide support to the emergency shelter 80.

Figure 15C:
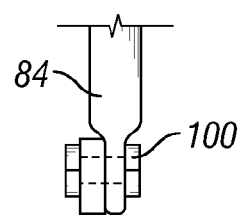
Figure 15D:
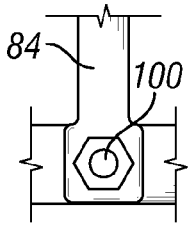

As FIG. 14 illustrates, the emergency shelter 80 further includes a fabric cover 96 suspended over the roll bar 12, the horizontal bar 88, and the three nylon straps 92. The fabric cover 96 further includes a plurality of zippered openings 98. The openings 98 may provide outward visibility to the ATV operator, may allow the operator to enter or exit the ATV 10 while the shelter 80 is assembled and in place, or may allow increased airflow through the shelter 80. The fabric cover 96 further comprises a zippered opening 98 at the rear of the ATV 10 to allow access to the rear rack 94. The shelter 80 may have sufficient strength so that the ATV 10 may be driven while the shelter 80 is assembled. The fabric cover 96 may comprise a water-proof material. The lights 36 may be rotated downward and activated while the shelter 80 is assembled to provide light within the shelter 80. FIGS. 15A-15D depict the vertical support members 84 and the top horizontal bar 88 attached thereto. As shown in FIGS. 15C and 15D, each vertical support member rotates on a bolt 100 passing through a portion of the front rack 86.

Figure 16:
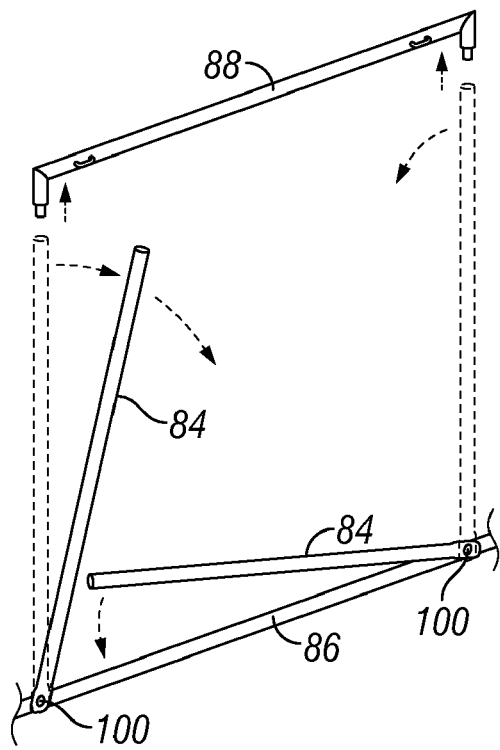
FIG. 16 depicts a disassembly method for the ATV emergency shelter/hunting blind light-weight support.
Figure 17:
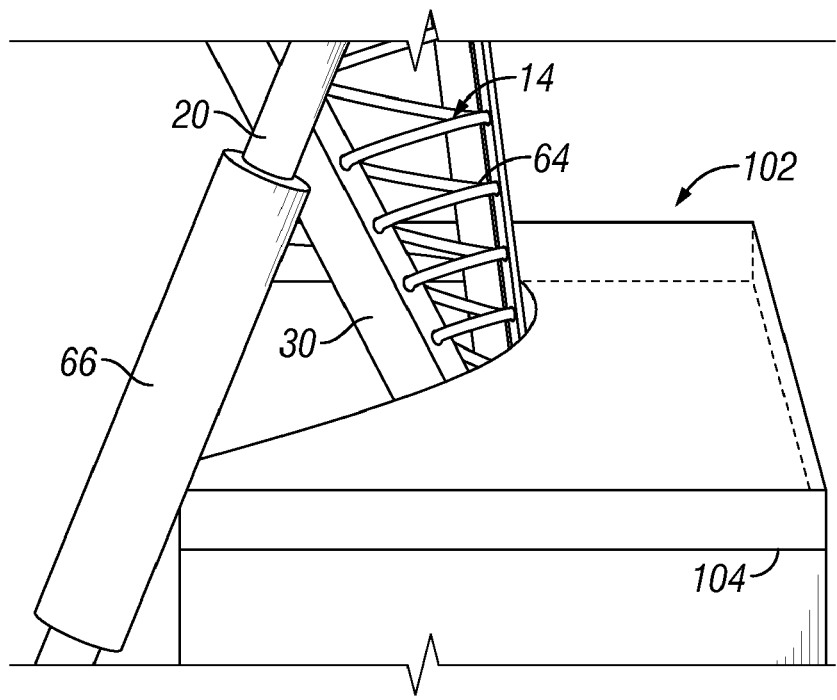
FIG. 17 depicts a cargo bag installed at the rear of an ATV.

FIG. 16 illustrates a process for disassembling the frame 82. The top horizontal bar 88 can be removed from the vertical support members 84 with an upward force. Each vertical support member 84 hinges downward and inward by rotating about the bolts 100 until laying flat on the front rack 86. A nylon strap with hook-and-loop fasteners (not shown) may secure the disassembled support members 84 to the front rack 86. The horizontal bar 88, along with the nylon straps 90, 92 and fabric cover 96, may be stowed in a cargo bag 102 depicted in FIG. 17. The cargo bag 102 may be a form-fitted fabric container with a profile that conforms to the shape of the rear support members 30 and seat back 14. The cargo bag 102 has a zippered opening 104, and has a large enough internal volume to receive other items for stowage. For example, an emergency flashlight, heater, food, water, fire extinguisher, or other survival or emergency gear may be stowed in the cargo bag 102.

Referring back to FIG. 14, the emergency shelter 80 may further be used as a hunting blind. The front zippered opening 98 may provide a large field of view through which the ATV operator may survey the vicinity. The roll bar system comprises a rifle support 106, as depicted in FIGS. 18A-18B. The rifle support 106 comprises a threaded pin 108 or knurled knob on an adjustable-height rifle rest 110. The rifle support 106 attaches to the front rack 86 (depicted in FIG. 14) with the bracket 112. The bracket 112 comprises a vertical plate 114 adjoining a horizontal plate 116 with a bottom horizontal plate (not shown). The bottom horizontal plate has a threaded bolt hole. A horizontal clamp surface 122, positioned above the bottom horizontal plate, is rotatably attached to a bolt 124 passing through the threaded bolt hole. As the bolt 124 is rotated clockwise into the threaded bolt hole, the bolt moves upward due to the interaction between the bolt threads and internal threads of the bolt hole, urging the clamp surface 122 upward toward the top horizontal plate 116. To install the rifle support 106 onto the ATV front rack 86, the bracket 112 may slid onto a rail 126 of the front rack 86, thus positioning the rail 126 between the horizontal plate 116 and the clamp surface 122. By tightening the bolt 124, one can thereby cause the clamp surface 122 to clamp upon the rail 126 and secure the rifle support 106 to the front rack 86. The top horizontal plate 116 is welded to a vertical support sleeve 128. The support sleeve 128 slidably receives the rifle rest 110, which has a vertical shaft 130 fixed to a V-shaped rifle rest surface 132. The ATV operator may place a rifle 134 on the rest surface 132, which may provide stabilization to the rifle 134. The rifle support 106 may be selectively adjusted to a suitable height customized to the ATV operator, after which the operator may tighten the threaded pin 108 to lock the rifle rest 110 into its vertical position.

Figure 19A:
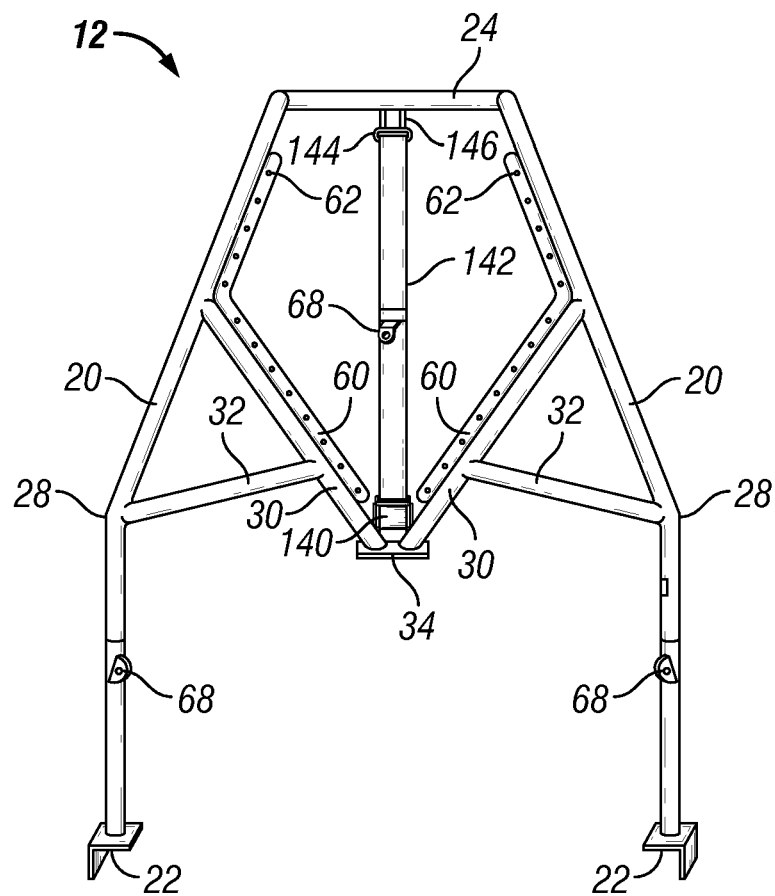
FIGS. 19A-19B depict an ATV roll bar system with a seat belt retractor.
Figure 19B:
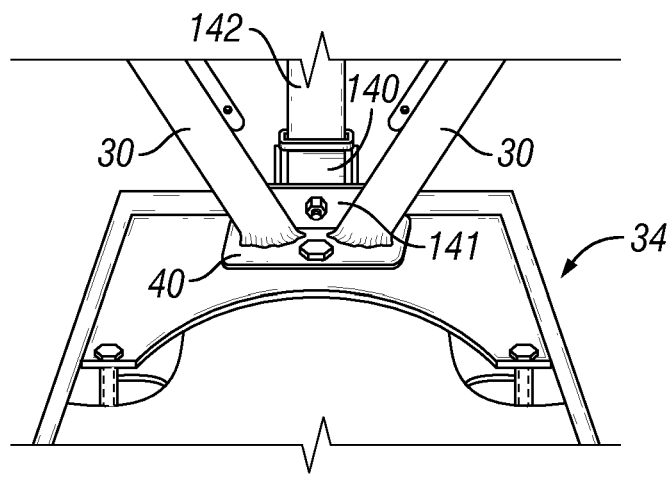

As shown in FIGS. 19A and 19B, the ATV may include a seat belt retractor 140. The seat belt retractor 140 is bolted to a vertical back mount plate 141 (depicted in FIG. 19B) that is welded to the back mounting plate 40. A retractable seat belt 142 rolls up within the retractor 140 when not being used due to a continuous tension applied to the retractable seat belt 142 by a spring (not shown) within the retractor 140. As shown in FIG. 19A, the retractable seat belt 142 extends upward from the retractor 140, passes through a slot 144 in a seat belt bracket 146 connected to the roll bar top member 24, and hangs there from. A seat belt connector 68 is fastened to the hanging end of the retractable seat belt 142. The seat belt connector 68 may connect to other seat belt 16 straps and buckles 69 (not shown) that may be connected to the side seat belt connectors 68 (shown in FIG. 19A), thereby securing the operator to the ATV.

The operator extends the seat belt 142 from the retractor 140 by pulling the seat belts 16, at which point he may interconnect the seat belt buckles 69 (not shown in FIGS. 19A-19B), thereby securing himself to the ATV. While the operator is driving the ATV equipped with the seat belt retractor 140, the spring within the retractor 140 continuously applies tension to the seat belts 16 via the retractable seat belt 142, thus maintaining the seat belts 16 snugly against the operator's body. However, the operator may still move upon the seat 26, lean, and perform other motions common during ATV driving. As the operator performs such movements, the seat belts 142 and 16 remain taut due to the internal spring of the retractor 140.

When the ATV 10 undergoes sudden or rapid movement, such as deceleration due to collision, a rollover event, going airborne, or emergency braking, the retractor 140 locks, preventing the retractable seat belt 142 from being further extended from the retractor 140, which prevents additional movement of the seat belt 16. In this manner, the seat belts 142, 16 and retractor 140 may maintain the operator in place on the ATV seat 26 and may prevent injury or death.

FIG. 20 is a diagram of an embodiment of a tilt sensor system 150 adapted to be installed on an ATV. The tilt sensor system 150 includes a tilt sensor 152. The tilt sensor 152 outputs an electrical signal if the ATV has an angle of inclination exceeding a predetermined threshold value while an operator is driving the ATV. This signal passes to a negative feedback circuit 154. The negative feedback circuit 154 passes the signal to the alarm unit 156 only if the negative feedback circuit 154 determines that the ATV is actually tilting beyond the predetermined threshold value, as opposed to an inadvertent signal from the tilt sensor 152. Such inadvertent signals may be caused by the ATV bouncing as it passes over rough terrain, for example. One manner in which the negative feedback circuit 154 may determine if the signal is inadvertent or not is by measuring if the signal has a time duration greater than a predetermined threshold, which would indicate that the signal legitimately represents excessive ATV inclination. The negative feedback circuit 154 comprises electrical circuit components adapted to attenuate or cancel such inadvertent alarm signals. When the alarm unit 156 receives the signal, it activates a warning alarm to alert the operator that potential rollover conditions exist. FIG. 1 depicts possible mounting locations for enclosures that contain the tilt sensor 152 and alarm unit 156. The negative feedback circuit 154 may be contained in the same enclosure as the tilt sensor 152.

FIG. 21 depicts a hinged roll bar 160. As shown in FIG. 21, the hinged roll bar 160 has side mounts 22 and a back mount 34 similar to the side mounts 22 and back mount 34 described above. The hinged roll bar 160 further has side braces 32, back brace 30, and top member 24 similar to side braces 32, back braces 30, and top member 24, respectively. A hinged joint 172 on each of two side members 174 allows the operator to rotate a top section of the roll bar 160 down, thus diminishing the height of the roll bar 160. The ability of roll bar 160 to thereby collapse allows an ATV to travel across terrain where the height of an uncollapsed roll bar may restrict access. For example, certain trails have trees and other growth which would restrict passage of an ATV with an uncollapsed roll bar 160 because of its height, whereas a collapsed roll bar 160 may have a low enough profile that the ATV can pass through unimpeded. Similarly, transport of an ATV may be made easier with the hinged roll bar 160. For example, certain trailers may have a ceiling that is too low to allow entrance to an ATV with an uncollapsed roll bar; the ATV user may need to remove any roll bar that is too tall to fit within such a trailer. However, the hinged roll bar 160 may collapse and thereby fit within trailers that are otherwise be too small to accept an ATV with a roll bar.

As shown by FIGS. 22A and 22B, the hinged joint 172 is formed by two hinge members 176 mated together by a bolt 178. Each hinge member 176 has a machined end 180 that seats within a section of roll bar tubing of the side member 174. The bolt 178 acts as a clevis pin, allowing the upper portion of the roll bar 160 to rotate around the lower portion and thereby collapse when so desired. The hinge members 176 each have a crowned end 182, allowing rotation between each pair of hinge members 176. When the roll bar 160 is in an extended position, the hinge members 176 seat against each other to maintain the roll bar 160 in its extended, upright condition. Alternatively, the hinged joint 172 may include a locking means such as a second bolt and cotter pin or other locking methods already known in the art to secure the roll bar 160 in its upright and/or collapsed state.

Figure 23:
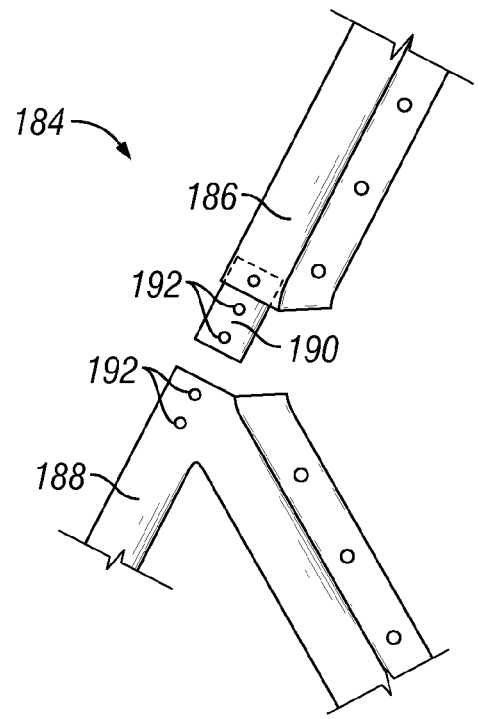
FIG. 23 is a depiction of a removable section of an ATV roll bar.

FIG. 23 depicts a roll bar 184 that includes a top section 186 that is removable from the bottom section 188. The roll bar 184 includes an internal shaft 190 that snugly fits within the tubing of the roll bar 184. The internal shaft 190 is fixed within the tubing of the top section 186. The roll bar 184 may be assembled by inserting the internal shaft 190 into the tubing of the bottom section 188. The internal shaft 190 may then be secured to the bottom section 188 by fasteners such as nuts and bolts and the like. The lower section 188 and internal shaft 190 include holes 192 to provide a means of securing the sections 186, 188 to the internal shaft 190. Alternatively, other means known in the art may be used to secure sections of the roll bar 184 to each other.

Figure 24A:
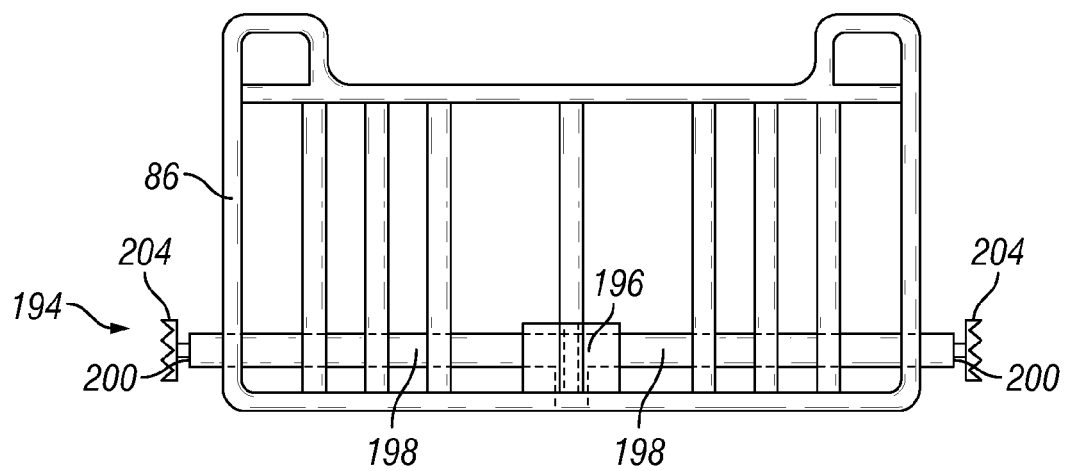
FIGS. 24A-24D depict a gravity-activated rollover stop assembly.
Figure 24B:
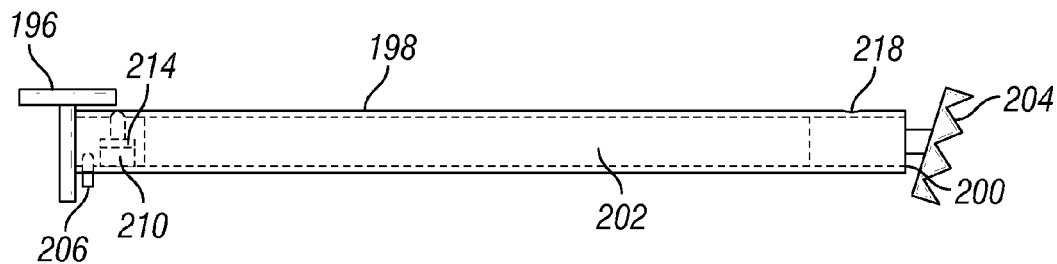
Figure 24C:
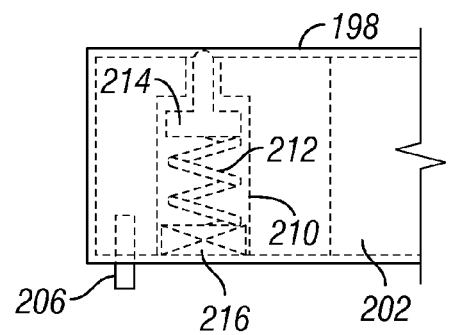
Figure 24D:

FIG. 24A depicts a gravity-activated rollover stop assembly 194 mounted on an ATV front rack 86. The rollover stop assembly 194 is securely mounted to an ATV frame member (not shown in FIG. 24A). The rollover stop assembly 194 comprises a tee bar mount 196 mounted to the ATV frame member and front rack 86 at roughly a center of the ATV. The tee bar mount 196 secures two horizontal lateral tubular housings 198. The tubular housings 198 have a closed or inner end where they join with the tee bar mount 196 and an outer-facing open end 200. As depicted in FIG. 24B-D, each tubular housing 198 houses a cylindrical stop bar 202. The stop bars 202 may partially slide in axial directions in and out of the housing 198 through the open ends 200. Each stop bar 202 has an outer end and an inner end respectively corresponding to the outer and inner and ends of its housing 198. Outer ends of the stop bars 202 are securely fixed to stop pads 204. The stop pads 204 comprise an axial facing plate having outer-facing surface ridges. The housings 198, stop bars 200, and stop pads 204 are manufactured from a strong, durable material, for example steel.

The stop bars 202 each have a set screw 206 corresponding to a set screw slot 208 in each tubular housing 198 along the length of the tubular housing. Interaction between the set screw 206 and corresponding set screw slot 208 prevents relative rotation of the stop bar 202 within the tubular housing 198 while allowing the stop bar 202 to freely slide axially in and out of the tubular housing 198. The stop bars 202 each have a cavity 210 at its inner end. A radially-oriented spring 212 and pin 214 are located within the cavity 210. A cap 216 maintains the spring 212 in place in the cavity 210 in a compressed state between the pin 214 and cap 216. The tubular housing 198 has a stop hole 218 near its open end 200 that is placed to align radially with the pin 214. When the stop bar 202 has slid outward enough that the pin 214 is aligned axially with the stop hole 218, the spring's 212 compression pushes the pin 214 partially through the stop hole 218. While the pin 214 is thus engaged with the stop hole 218, the stop bar 202 is in its fully extended position and will be restricted from further movement relative to the tubular housing 198.

The gravity-activated rollover stop assembly 194 serves as an added layer of protection to prevent injury in the event of a rollover accident on an ATV. As an ATV begins to roll over, gravity and/or momentum causes one of the stop bars 202 to slide outward in the direction of tilt. If the ATV tilts above a certain threshold, the stop bar 202 will slide to a fully extended position, at which point the pin 214 engages with the stop hole 218 as described above. The stop bar 202 will thereby be locked in its fully extended position and may absorb energy from the falling or rolling ATV, which may spare the ATV operator from injury or death. The stop bar 202 may be retracted by depressing the pin 214 to disengage it from the hole 218 and pushing the stop bar 202 into the housing 198.

Figure 25A:
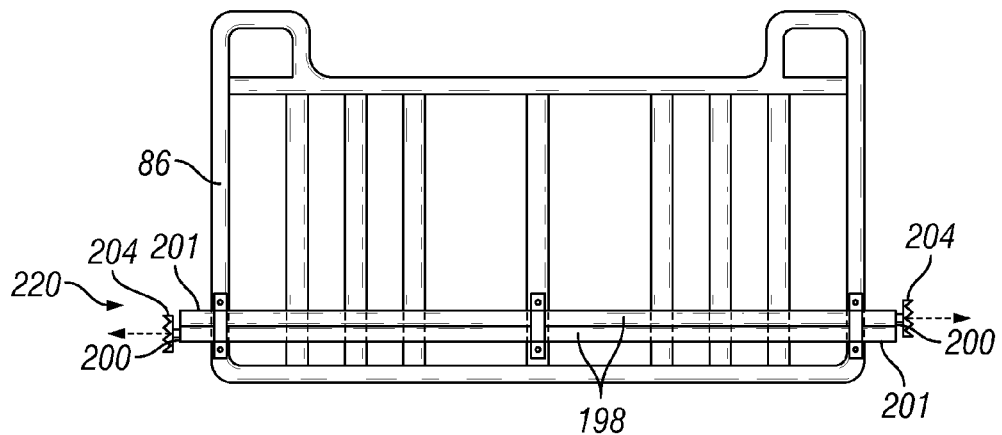
FIGS. 25A-25C depict a spring-actuated rollover stop assembly.
Figure 25B:
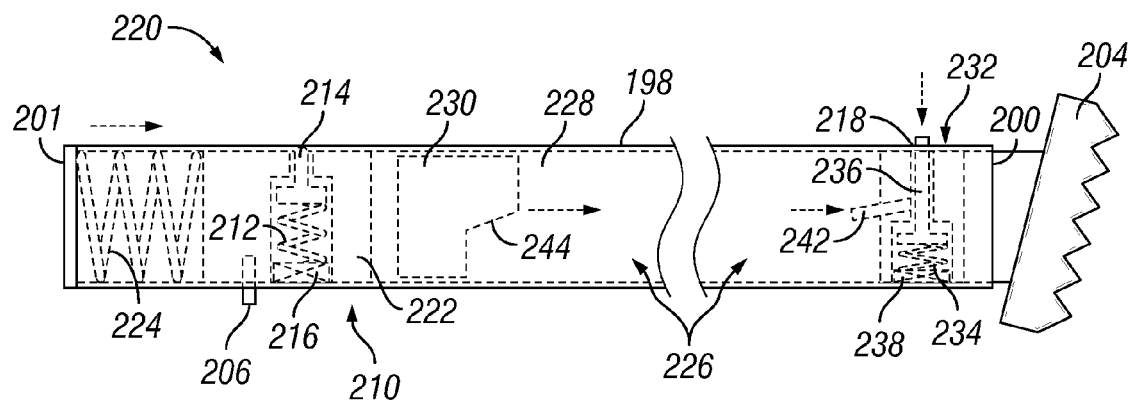

As depicted in FIG. 25A, a spring-actuated rollover stop assembly 220 includes two horizontal, laterally oriented tubular housings 198. The housings 198 may be anchored to the ATV front rack 86 or to frame members of the ATV (not shown in FIG. 25A). Each housing 198 has an open end 200 and a closed end 201. FIG. 25B shows that the spring-actuated rollover stop assembly 220 further includes a stop bar 222 disposed within the housing 198. As described above, the housing 198 includes a set screw slot 208 (as depicted in FIG. 24D) and a stop hole 218 near the open end 200. Similar to the stop bar 202, the stop bar 222 incorporates a set screw 206, cavity 210, spring 212, pin 214, and cavity cap 216 in a configuration similar to the gravity-activated roll over stop assembly 194. However, the spring-actuated rollover stop assembly 220 differs from the gravity-activated roll over stop assembly 194 in that it includes an actuator spring 224 and the stop bar 222 is selectively retained in a retracted position. The spring actuated rollover stop assembly 220 may include a release assembly 226 that may be used to selectively release the stop bar 222 from the retracted position.

The actuator spring 224 is located at the closed end 201 of the tubular housing 198 and applies a positive force upon the stop bar 222. The release assembly 226 has a cylindrical cavity 228 in the stop bar 222. The cavity 228 houses a sliding weight 230 that is machined to freely slide axially within the cavity 228. The release assembly further includes a release cavity 232 located near the end of the stop bar 222 to which the stop pad 204 is affixed. A release spring 234, release pin 236, and release cavity cap 238 are arranged within the release cavity 232 in a manner similar to the spring 212, pin 214, and cavity cap 216 arrangement in the cavity 210 on the opposite end of the stop bar 222. The release pin 236 partially passes through hole 218 in the housing 198. The release spring 234 applies a constant force to maintain the release pin 236 in the hole 218. Thus, unless the release spring 234 force is overcome by a downward force on the release pin 236, the release pin 236 will remain in the hole 218 and the stop bar 222 will not slide out or otherwise move relative to the housing 198. The release pin 236 has a release lever 242 comprising a rigid member affixed to the release pin 236 at an angle. The sliding weight 230 includes an inclined surface 244 that faces the release pin 236. The inclined surface 244 and release lever 242 are situated such that as the sliding weight 230 draws near the release pin 236, the inclined surface 244 engages the release lever 242 and exerts a force upon the release pin 236 that counters the release spring 234 force.

Figure 25C:
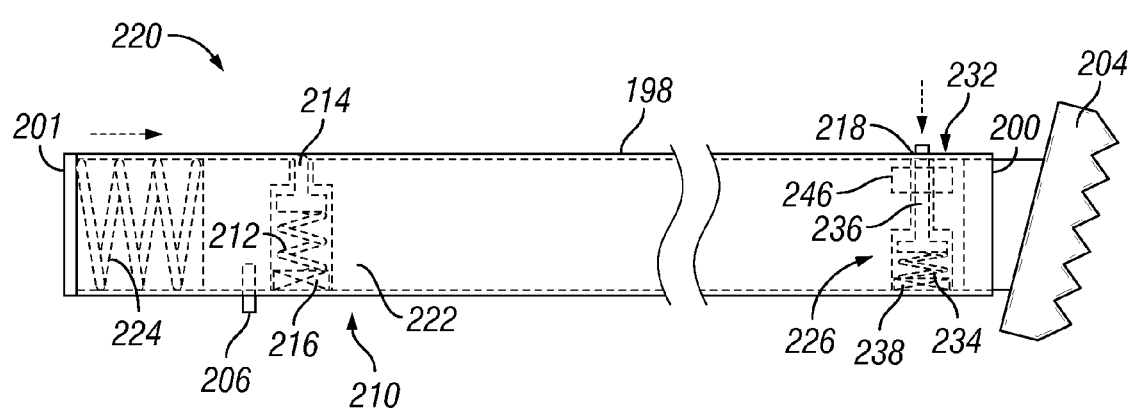

As an ATV approaches rollover conditions, one of the sliding weights 230 will slide towards the release pin 236 by gravity, momentum, or other external forces. The inclined surface 244 will interact with the release lever 242, forcing the release pin 236 down and completely out from the hole 218. Upon disengagement of the release pin 236 from the hole 218, the actuator spring 224 pushes the stop bar 222 outward until the pin 214 engages with the hole 218, thereby extending the stop bar 222 and stop pad 204. As described above in relation to the gravity-activated roll over stop assembly 194, when the stop bar 222 is fully extended and locked in place by the pin 214 and hole 218, the spring-actuated rollover stop assembly 220 may prevent or mitigate injury to the ATV operator and/or any passengers thereon. Alternatively, an actuator solenoid 246 may provide the force to release the release pin 236 from the hole 218, as depicted in FIG. 25C, thereby allowing the spring 224 to extend the stop bar 222. The actuator solenoid 246 may be triggered by the tilt sensor 152 in response to potential rollover conditions or by any other means of detecting rollover conditions.

The roll bar system and components thereof, as described herein, may be retrofitted onto an ATV by modifying the components to fit the ATV. For example, the mounting plates and other mounting hardware may be mounted at positions different than those described in the disclosure based upon the shape of the ATV frame. Other modifications would be apparent to one of ordinary skill having the benefit of this disclosure.

Although various embodiments have been shown and described herein, other embodiments that are apparent to those of ordinary skill in the art having the benefit of this disclosure, including embodiments that do not provide all of the features and advantages set forth herein, are also within the scope of the disclosure. Rather, the scope of the disclosure is defined only by reference to the appended claims and equivalents thereof.

What is claimed:

1. An ATV equipped with a roll bar system, comprising:
   a roll bar having a first side member, a second side member, and a top member, wherein the first and second side members and the top member comprise tubing, and wherein the side members generally extend vertically and are connected to the top member and to an ATV frame, thereby forming an arch over the ATV;

a seat back comprising a flexible material bound between the first and second side members;

a first rear support member and a second rear support member, wherein a first end of the first support member is connected to the first side member and a second end of the first support member is connected to a rear mounting plate, and wherein a first end of the second support member is connected to the second side member and a second end of the second support member is connected to the rear mounting plate, wherein the rear mounting plate is fixed to the ATV frame;

a first side support beam and a second side support beam, wherein a first end of the first side support beam is connected to the first rear support member and a second end of the first side support beam is connected to the first side member, and wherein a first end of the second side support beam is connected to the second rear support member and a second end of the second side support beam is connected to the second side member;

a seat belt and a plurality of seat belt connectors fixed to the roll bar, the seat belt connectors adapted to connect a portion of the seat belt to the roll bar;

a seat belt retractor fixed to the rear mounting plate, the seat belt retractor having a locked state and an unlocked state wherein a portion of the seat belt is connected within the retractor, and wherein the retractor is adapted to allow extension of the seat belt from within the retractor while unlocked and to prevent extension of the seat belt from within the retractor while locked; and a foot rest guard.

2. The ATV of claim 1, wherein the first and second side members each comprise a hinged section adapted to provide the roll bar with an upright state and a collapsed state.

3. The ATV of claim 1, wherein the first and second side members each comprise a removably-connectable joint adapted to allow a portion of the roll bar to be removed from another portion of the roll bar.

4. The ATV of claim 1 further comprising a rollover stop bar adapted to extend from a retracted position and selectively lock into an extended position.

5. The ATV of claim 4, wherein the rollover stop bar is adapted to extend due to the inclination of the ATV.

6. The ATV of claim 4, wherein the rollover stop bar is adapted to selectively lock in the retracted position.

7. The ATV of claim 6 further comprising a spring that is adapted to extend the rollover stop bar when the rollover stop bar is released from the retracted position.

8. The ATV of claim 4, wherein:
the rollover stop bar is adapted to extend in response to being released from a retracted locked position; and
the rollover stop bar comprises a solenoid adapted to selectively release the stop bar from its retracted locked position in response to a signal from an electronic safety warning system.

9. The ATV of claim 1 further comprising an electronic safety warning system adapted to output a signal if the ATV has an inclination exceeding a predetermined value.

* * * * *